United States Patent
Hibino et al.

[11] Patent Number: 5,396,426
[45] Date of Patent: Mar. 7, 1995

[54] CONSTANT SPEED TRAVELING APPARATUS FOR VEHICLE WITH INTER-VEHICLE DISTANCE ADJUSTMENT FUNCTION

[75] Inventors: Katsuhiko Hibino, Toyoake; Mitsufumi Hashimoto, Kariya; Akira Kurahashi, Aichi, all of Japan

[73] Assignee: Nippondenso Co., Ltd., Kariya, Japan

[21] Appl. No.: 111,401

[22] Filed: Aug. 25, 1993

[30] Foreign Application Priority Data

Aug. 26, 1992 [JP] Japan ................................. 4-227531
Dec. 15, 1992 [JP] Japan ................................. 4-334625

[51] Int. Cl.⁶ ............................................. G06F 15/50
[52] U.S. Cl. ............................. 364/426.04; 364/460; 364/461; 180/169; 180/170; 342/455; 123/352
[58] Field of Search ................. 364/426.04, 431.07, 364/460, 461; 180/167-169, 176-179; 123/350, 352; 342/454, 455; 340/901-904

[56] References Cited

U.S. PATENT DOCUMENTS

| | | | |
|---|---|---|---|
| 4,622,636 | 11/1986 | Tachibana | 364/426.04 |
| 4,670,845 | 6/1987 | Etoh | 364/461 |
| 4,703,429 | 10/1987 | Sakata | 364/426.04 |
| 5,166,881 | 11/1992 | Akasu | 364/426.04 |
| 5,197,562 | 3/1993 | Kakinami et al. | 364/426.04 |
| 5,234,071 | 8/1993 | Kajiwara | 364/426.04 |

FOREIGN PATENT DOCUMENTS 63-269736 11/1988 Japan.
3220028 9/1991 Japan.

*Primary Examiner*—Gary Chin
*Attorney, Agent, or Firm*—Cushman, Darby & Cushman

[57] ABSTRACT

An apparatus includes an inter-vehicle distance sensor for measuring a distance from a self vehicle to a vehicle traveling ahead, and a relative speed is calculated on the basis of the inter-vehicle distance data detected by the inter-vehicle distance sensor. When a variation of the relative speed is small, it is recognized that a vehicle is present ahead of the self vehicle. An acceleration/deceleration is obtained from a stored acceleration/deceleration basic map on the basis of a difference between the inter-vehicle distance and a target inter-vehicle distance, and the relative speed with the vehicle ahead, and an acceleration/deceleration correction coefficient is calculated from a correction map set with adjustment constants in correspondence with the measured inter-vehicle distance. An acceleration/deceleration is calculated by multiplying the acceleration/deceleration with the correction coefficient. A new target vehicle speed is calculated on the basis of the calculated acceleration/deceleration, and a previously set target vehicle speed.

19 Claims, 12 Drawing Sheets

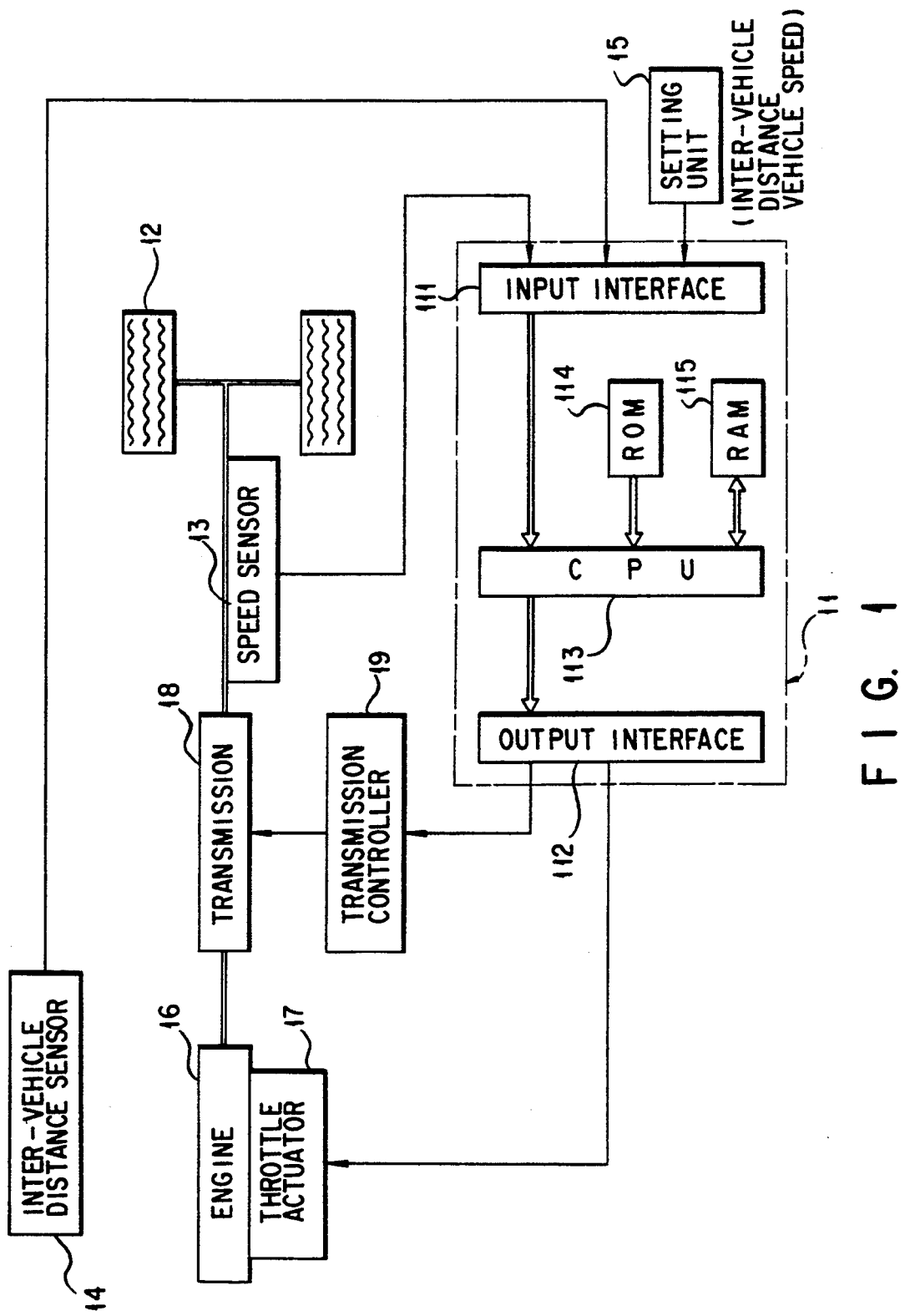
F I G. 1

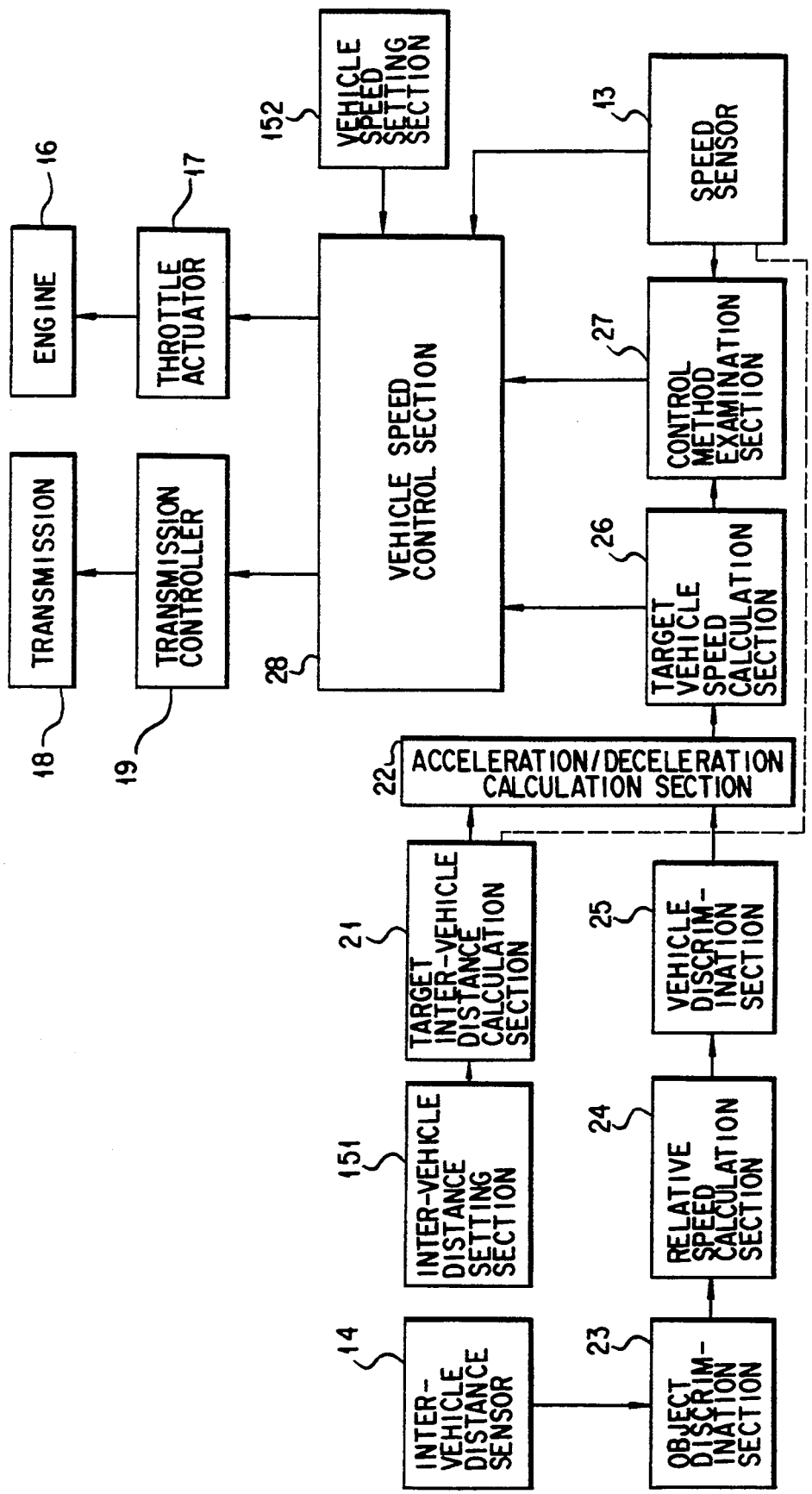
F I G. 2

| RELATIVE SPEED (km/h) | CURRENT DISTANCE - TARGET DISTANCE (m) | | | | | | |
|---|---|---|---|---|---|---|---|
| | −32 | −16 | 0 | 16 | 32 | 48 | 64 |
| AP-PROACH −24 | −10 | −10 | −10 | −10 | −10 | −3 | −1.5 |
| AP-PROACH −16 | −10 | −10 | −10 | −5 | −5 | −3 | −0.5 |
| AP-PROACH −8 | −10 | −5 | −3 | −1.5 | 0 | 0 | 0.5 |
| MAINTAIN 0 | −10 | −2.5 | 0 | 1.0 | 1.5 | 2.0 | 2.5 |
| RECEDE 8 | −2.0 | 2.0 | 3.0 | 4.0 | 3.0 | 3.0 | 3.0 |
| RECEDE 16 | 0 | 2.0 | 2.0 | 2.5 | 3.0 | 3.0 | 3.0 |

(UNIT km/sec)

a REGION : CONSTANT SPEED TRAVELING CONTROL BASED ON CALCULATED TARGET VEHICLE SPEED
b REGION : THROTTLE COMPLETE CLOSING
c REGION : THROTTLE COMPLETE CLOSING + OD CUT
d REGION : HYSTERESIS REGION

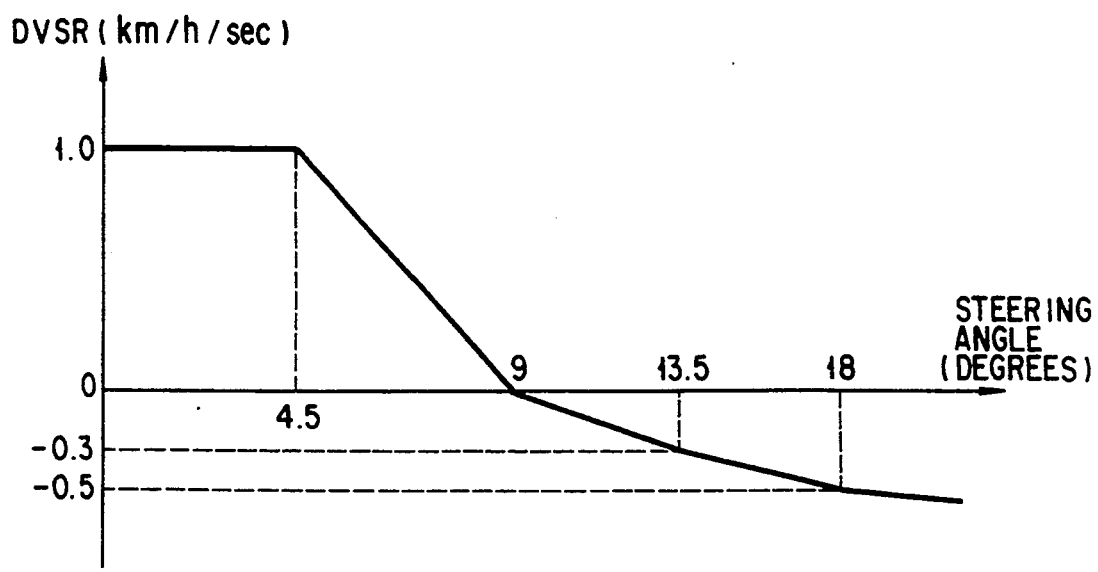
F I G. 9
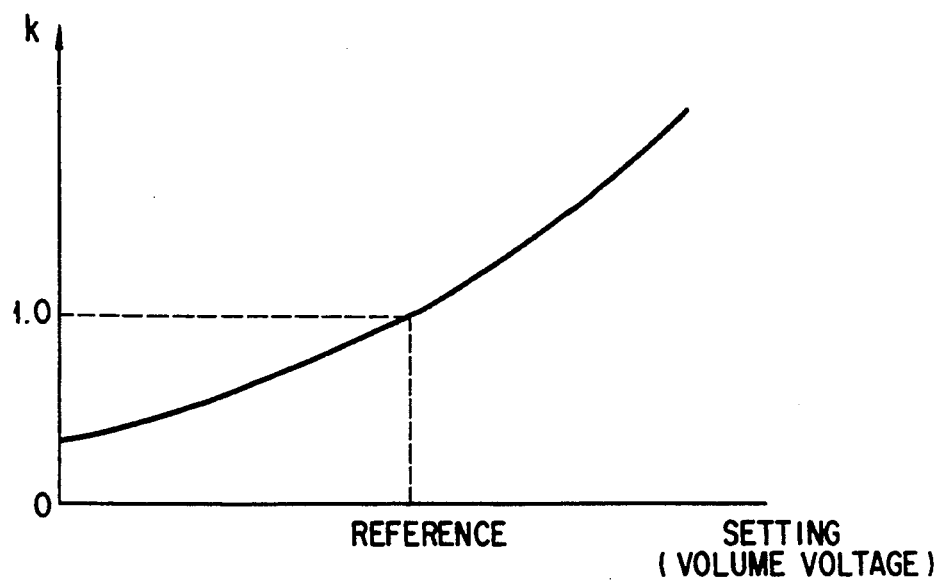
F I G. 11

| | | CURRENT DISTANCE − TARGET DISTANCE (m) | | | | | | |
|---|---|---|---|---|---|---|---|---|
| | RELATIVE SPEED (km/h) | −32 | −16 | 0 | 16 | 32 | 48 | 64 |
| APPROACH | −24 | −12 | −12 | −10 | −9 | −9 | −9 | −9 |
| APPROACH | −16 | −12 | −12 | −10 | −9 | −9 | −9 | −9 |
| APPROACH | −8 | −12 | −5.5 | −3 | −1.8 | −1.8 | −1.8 | −1.8 |
| MAINTAIN | −8 | −10 | −2.5 | 0 | 1.2 | 1.2 | 1.2 | 1.2 |
| RECEDE | 8 | −2.0 | 2.0 | 3.0 | 4.2 | 4.2 | 4.2 | 4.2 |
| RECEDE | 16 | 0 | 3.5 | 6.0 | 7.2 | 7.2 | 7.2 | 7.2 |

(UNIT km/h sec)

F I G. 13

CONSTANT SPEED TRAVELING APPARATUS FOR VEHICLE WITH INTER-VEHICLE DISTANCE ADJUSTMENT FUNCTION

BACKGROUND OF THE INVENTION

1. Field of the Invention

The present invention relates to a constant speed traveling control apparatus for a vehicle and, more particularly, to a constant speed traveling apparatus having an inter-vehicle distance adjustment function for performing vehicle traveling control while keeping a proper inter-vehicle distance to a vehicle traveling ahead.

2. Description of the Related Art

A vehicle having a constant speed traveling control apparatus will travel at a preset speed even if a driver does not perform a drive operation. When a vehicle subjected to constant speed traveling control at a preset vehicle speed recognizes a vehicle traveling ahead, it measures an inter-vehicle distance to the vehicle traveling ahead, and controls the traveling speed of the vehicle in correspondence with the measured inter-vehicle distance so as to keep a proper inter-vehicle distance to the vehicle ahead. A constant speed traveling apparatus for automatically controlling and varying the vehicle speed when a vehicle traveling ahead is found is disclosed in Jpn. Pat. Appln. KOKAI Publication No. 3-220028.

In this traveling control apparatus, a target traveling speed is calculated on the basis of a preset condition in correspondence with the measured inter-vehicle distance. A control condition for increasing or decreasing the traveling speed of the self vehicle is discriminated from a deviation between the current vehicle speed and the calculated target vehicle speed. Acceleration/deceleration control is made on the basis of the discriminated control condition. However, if the inter-vehicle distance is unnecessarily large, another vehicle may break in between a vehicle traveling ahead and the self vehicle. In this case, the inter-vehicle distance is immediately decreased, and the vehicle therefore undergoes abrupt deceleration in correspondence with the decreased inter-vehicle distance, thus giving considerable discomfort to a driver.

In a vehicle constant speed traveling apparatus disclosed in Jpn. Pat. Appln. KOKAI Publication No. 63-269736, an apparatus obtained by adding an inter-vehicle distance adjustment function to a constant speed traveling control system is proposed. In this apparatus, if the current inter-vehicle distance is 30 m or more, constant speed traveling control is made; if it is less than 30 m, inter-vehicle distance adjustment control for keeping a constant inter-vehicle distance is made.

More specifically, in the constant speed traveling control mode, the throttle opening degree is controlled on the basis of a deviation between the target vehicle speed and the current vehicle speed, while in the inter-vehicle distance adjustment control mode for keeping a constant inter-vehicle distance, the throttle opening degree is controlled on the basis of a deviation between the target inter-vehicle distance and the current inter-vehicle distance.

However, a throttle opening degree control logic for making constant speed traveling control for stably traveling a vehicle at a preset speed, and a throttle opening degree control logic for performing vehicle speed control for keeping a constant inter-vehicle distance use different control parameters. Therefore, this device requires a function which maintains coordination between the two modes to make a smooth transition therebetween. This operation will be described in detail below.

During traveling, sensations experienced by a driver is an acceleration/deceleration caused by a change in throttle opening degree. Therefore, when the throttle opening degree control logic is different, and an actual opening/closing state of a throttle valve is different even in an identical traveling state, a driver feels a different traveling sensation. For this reason, throttle opening degree calculation parameters of the two modes must be adjusted in advance, so that a change in throttle opening degree obtained when a driver changes a set vehicle speed from 80 km/h to 85 km/h in the constant speed traveling control becomes the same as a change in throttle opening degree obtained when the same change in speed occurs in the inter-vehicle distance adjustment control for keeping a constant inter-vehicle distance. If this adjustment is not performed, a driver experiences different traveling sensations in the constant speed control mode and in the inter-vehicle distance adjustment control mode.

In this pre-adjustment, control parameters are adjusted so as to obtain the same frequency and step response characteristics of a control system. Finally, traveling sensations experienced must be actually checked in a test using actual vehicles. The constant speed traveling control apparatus has already been widely spread, and many drivers have become accustomed to its traveling feeling. In consideration of such situation, the throttle opening degree calculation parameters of the inter-vehicle distance adjustment control for keeping an inter-vehicle distance must be adjusted to ensure that the traveling sensation of this control coincides with that of the constant speed traveling control previously used.

However, when the control parameters of the throttle opening degree calculation portion are adjusted, characteristics required for the inter-vehicle distance adjustment control do not always coincide with those required for the constant speed traveling control. If these characteristics do not coincide with each other, processing for correcting another factor (e.g., correcting a target inter-vehicle distance) is required. More specifically, when an operation for causing traveling sensations of the two different control modes to coincide with each other is performed, the development load is increased as compared to a case wherein an identical throttle opening degree calculation is used, and inter-vehicle distance adjustment control characteristics required for keeping a constant inter-vehicle distance may not be realized. For this purpose, new correction processing must be added.

When the inter-vehicle distance to a vehicle ahead is infinity, i.e., when it is determined that no vehicle is present ahead of the self vehicle, acceleration control is adjusted to a preset vehicle speed. In this case, if a set acceleration is small, a long time is required until the vehicle speed returns to the set vehicle speed, thus giving discomfort to a driver. When a set acceleration is large, the self vehicle may immediately approach a vehicle ahead under the acceleration control in consideration of a situation that the detection mechanism erroneously determines that no vehicle is present ahead of the self vehicle even though, in fact, a vehicle is travelling ahead of the self vehicle.

SUMMARY OF THE INVENTION

It is an object of the present invention to provide a constant speed traveling apparatus having an inter-vehicle distance adjustment function, which can obtain the same traveling sensation in an acceleration/deceleration control state in a constant speed traveling control mode and in an acceleration/deceleration control state in an inter-vehicle distance adjustment control mode, and can prevent an abrupt deceleration even when another vehicle unexpectedly breaks in between a vehicle ahead and the self vehicle.

It is another object of the present invention to provide a constant speed traveling control apparatus especially for a vehicle having an inter-vehicle distance adjustment function, which can realize acceleration control up to a set vehicle speed at an acceleration corresponding to an inter-vehicle distance to a vehicle ahead, and can quickly accelerate a vehicle to a set vehicle speed in, for example, a situation wherein it is determined that no vehicle is present ahead of the self vehicle, and safety is assured.

It is still another object of the present invention to realize automatic traveling speed control which can cause a feeling felt by a driver in a constant speed traveling control mode to coincide with that felt by the driver in a traveling control mode based on an inter-vehicle distance to a vehicle ahead, and can prevent discomfort to the driver.

In a constant speed traveling apparatus having an inter-vehicle distance adjustment function according to the present invention, distance data to an object traveling ahead is measured by inter-vehicle distance measurement means, a relative speed is calculated by relative speed calculation means on the basis of a change in measured inter-vehicle distance data, and vehicle recognition means recognizes on the basis of a change state of the relative speed that the object ahead is a vehicle. In such a vehicle recognition state, an acceleration/deceleration of a vehicle is calculated based on a difference between the inter-vehicle distance data and a set target inter-vehicle distance, and the relative speed, and a basic acceleration/deceleration is corrected on the basis of the calculated acceleration/deceleration and a target vehicle speed calculated in previous processing, thus obtaining a target vehicle speed. Vehicle speed control means controls the vehicle traveling speed on the basis of the calculated target vehicle speed and the current vehicle speed.

The apparatus comprises correction means for correcting the acceleration/deceleration of the vehicle so as to decrease the acceleration/deceleration as the inter-vehicle distance is larger.

In the constant speed traveling apparatus with the above arrangement, when a vehicle is present ahead of the self vehicle, the inter-vehicle distance therefrom is measured, and a relative speed between the vehicle ahead and the self vehicle is measured. The acceleration/deceleration of the self vehicle is calculated on the basis of the relationship between a difference between the measured inter-vehicle distance and a set target inter-vehicle distance, and the relative speed. The acceleration/deceleration may be stored in, e.g., a map. Thereafter, the current target vehicle speed is calculated based on the acceleration/deceleration, and the previously calculated target vehicle speed, and control for causing the actual vehicle traveling speed to approach the target vehicle speed is made. This control can adopt opening/closing control of an engine throttle, switching control of a transmission, and the like.

Since the acceleration/deceleration of the self vehicle is corrected in correspondence with the inter-vehicle distance, so that the acceleration/deceleration is decreased as the inter-vehicle distance is larger, coarse inter-vehicle distance control is made in a state wherein the inter-vehicle distance is large.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram for explaining a constant speed traveling apparatus according to the first embodiment of the present invention;

FIG. 2 is a block diagram showing a control logic of the first embodiment;

FIG. 9 is a graph showing the relationship between the acceleration/deceleration and the steering angle so as to explain the acceleration/deceleration;

FIG. 11 is a graph for explaining a correction coefficient of the third embodiment;

FIG. 13 is a table showing a second acceleration/deceleration basic map different from the acceleration/deceleration basic map shown in FIG. 4A.

DETAILED DESCRIPTION OF THE PREFERRED EMBODIMENTS

Figure 3A:
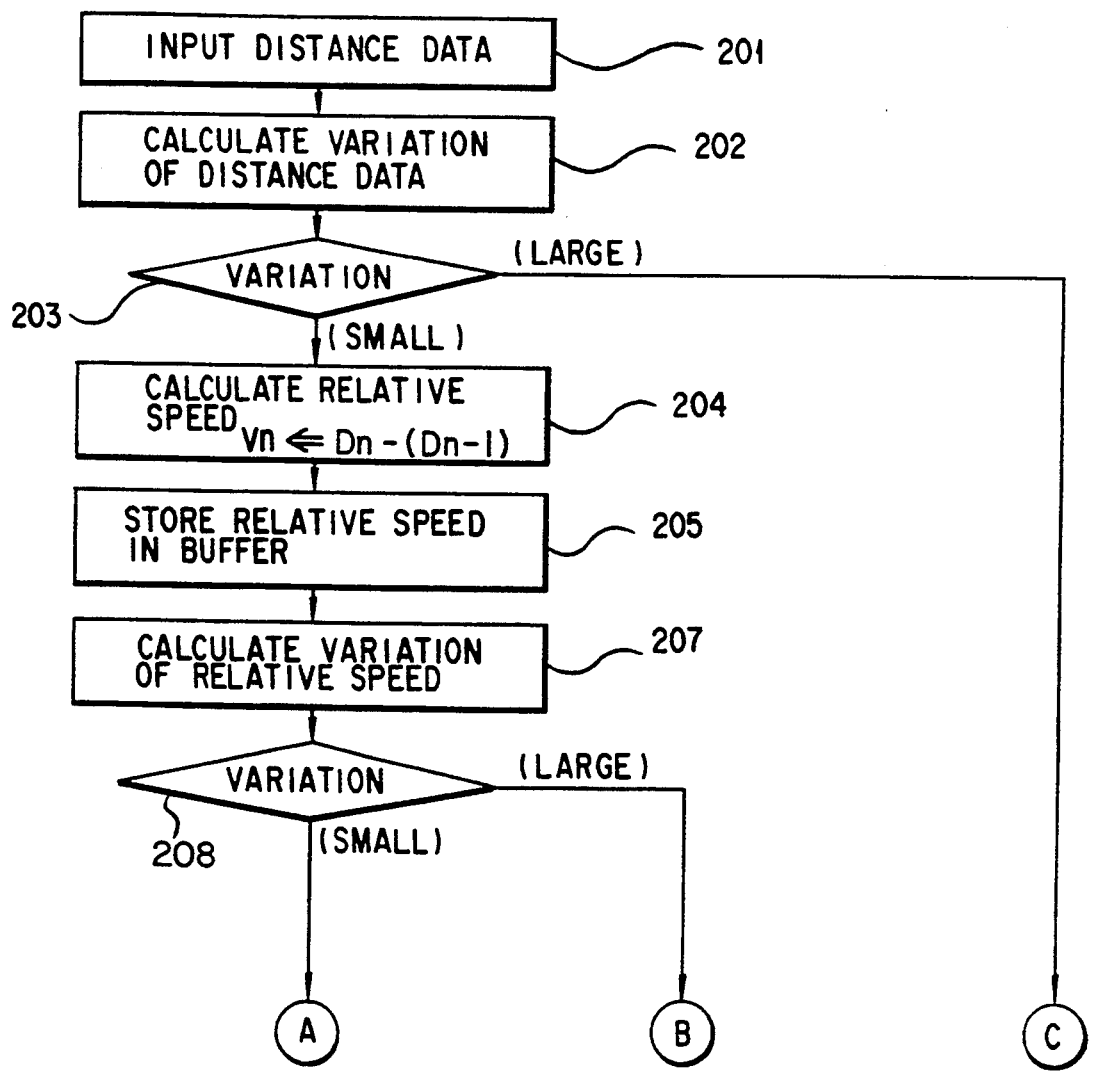
FIGS. 3A to 3C are flow charts for sequentially explaining the processing flow in the control logic.

FIG. 1 shows an arrangement of a constant speed traveling control apparatus for a vehicle according to the first embodiment of the present invention. A computer 11 for executing calculations for constant speed traveling control comprises an input interface 111 for receiving input information, and an output interface 112 for outputting, e.g., control information, and performs calculation operations using a CPU 113. The CPU 113 is connected to a ROM 114 for storing programs for executing, e.g., control operations, various maps for the calculation operations, and the like, and a RAM 115 for storing information based on, e.g., calculation control.

The computer 11 receives a detection signal from a vehicle speed sensor 13. The vehicle speed sensor 13 is set in association with wheels 12 of a vehicle. Every time the wheels 12 are rotated through a predetermined angle, a pulse signal is generated, and the sensor 13 counts the number of pulse signals generated within a predetermined period of time, thus obtaining traveling speed information of this vehicle. An inter-vehicle distance sensor 14 comprising, e.g., a laser radar for measuring a distance from the self vehicle to an object such as a vehicle traveling ahead is arranged in the front portion of the vehicle. A detection signal from the inter-vehicle distance sensor 14 is input to the computer 11. Furthermore, the computer 11 receives an inter-vehicle distance and an initial vehicle speed from a setting unit 15.

The output from the computer 11 is supplied as a control command to a throttle actuator 17 for driving a throttle mechanism, which controls an engine 16 for driving the vehicle. The driving force from the engine 16 is transmitted to the wheels 12 via a transmission 18, and drives this vehicle. The transmission 18 constituting the driving force transmission mechanism is controlled by a transmission controller 19. The transmission controller 19 receives a control command from the computer 11. More specifically, when the computer 11 controls the throttle actuator 17 and the transmission controller 19, the traveling speed of this vehicle is acceleration/deceleration-controlled.

FIG. 2 shows a control system of the apparatus. The setting unit is constituted by an inter-vehicle distance setting section 151 and an initial vehicle speed setting section 152, which are constituted by, e.g., switch mechanisms properly operated by a driver. Information set by the inter-vehicle distance setting section 151 is input to a target inter-vehicle distance calculation section 21 in the computer 11. Set inter-vehicle distance information calculated by the target inter-vehicle distance calculation section 21 is input to an acceleration/deceleration calculation section 22. The target inter-vehicle distance may be changed in correspondence with, e.g., the vehicle speed. For example, when the vehicle speed is high, a long inter-vehicle distance is set; when the vehicle speed is low, a short inter-vehicle distance is set.

The detection signal from the inter-vehicle distance sensor 14 is supplied to an object discrimination section 23. The object discrimination section 23 discriminates, e.g., a variation state of the detection signal from the inter-vehicle distance sensor 14, and determines whether or not the sensor 14 detects an object.

The detection signal from the inter-vehicle distance sensor 14 is also supplied to a relative speed calculation section 24. The section 24 calculates a relative speed between the self vehicle and a vehicle ahead on the basis of a change in inter-vehicle distance, and, more particularly, a change in inter-vehicle distance at a predetermined control period. The calculated relative speed information is supplied to a vehicle discrimination section 25. The section 25 always monitors the relative speed data to discriminate whether or not the object ahead is a vehicle. The discrimination result of the section 25 is input to the acceleration/deceleration calculation section 22. The vehicle discrimination processing may be executed inside the inter-vehicle distance sensor 14.

The acceleration/deceleration calculation section 22 calculates a proper target acceleration/deceleration on the basis of the target inter-vehicle distance, the relative speed, and the discrimination results from the object discrimination section 23 and the vehicle discrimination section 25. The target acceleration/deceleration calculated by the acceleration/deceleration calculation section 22 is integrated by a target vehicle speed calculation section 26 to calculate a target vehicle speed. Thereafter, a control method examination section 27 compares the current vehicle speed and the target vehicle speed to discriminate whether normal throttle control is to be continued, or the transmission, and the like need be controlled. For this purpose, the control method examination section 27 also receives vehicle speed data from the vehicle speed sensor 13.

The outputs from the target vehicle speed calculation section 26 and the control method examination section 27 are supplied to a vehicle speed control section 28 together with setting information from the vehicle speed setting section 152. The vehicle speed control section 28 performs constant speed traveling control for controlling the opening degree of a throttle valve by driving the throttle actuator 17 of the engine 16, so that the current vehicle speed detected by the vehicle speed sensor 13 coincides with the target vehicle speed. When the transmission 18 must also be controlled, the vehicle speed control section 28 supplies a command to the transmission controller 19 to execute shift control of the transmission 18.

The vehicle speed control section 28 also has a function of receiving an initial vehicle speed set by the vehicle speed setting section 152, a function of switching a control mode between a constant speed traveling control mode and an inter-vehicle distance control mode, and a function of canceling automatic control and starting manual acceleration/deceleration control. The switching operation between the constant speed traveling control mode and the inter-vehicle distance control mode need not always be performed based on data from the vehicle speed setting section 152, but may be performed when, for example, a condition for specifying a vehicle speed or an inter-vehicle distance is satisfied.

The processing in the computer 11 constituting the object discrimination section 23, the vehicle discrimination section 25, the acceleration/deceleration calculation section 22, the target vehicle speed calculation section 26, the control method examination section 27, and the like shown in FIG. 2 in the constant speed traveling apparatus will be described below with reference to the flow charts shown in FIGS. 3A to 3C.

Referring to FIG. 3A, inter-vehicle distance data is input in step 201. In step 202, the input inter-vehicle distance data are evaluated in units of control periods, and its variation is calculated. It is checked in step 203 on the basis of the calculation result of the variation of the inter-vehicle distance if the degree of variation is larger than a predetermined setting value. If the degree of variation is smaller than the setting value, it is determined that an object is present ahead of the vehicle (object detection state). In step 204, a relative speed ($v_n$) with the object ahead is calculated based on a change in inter-vehicle distance data, and in step 205, the calculated relative speed is stored in a buffer.

Figure 3B:
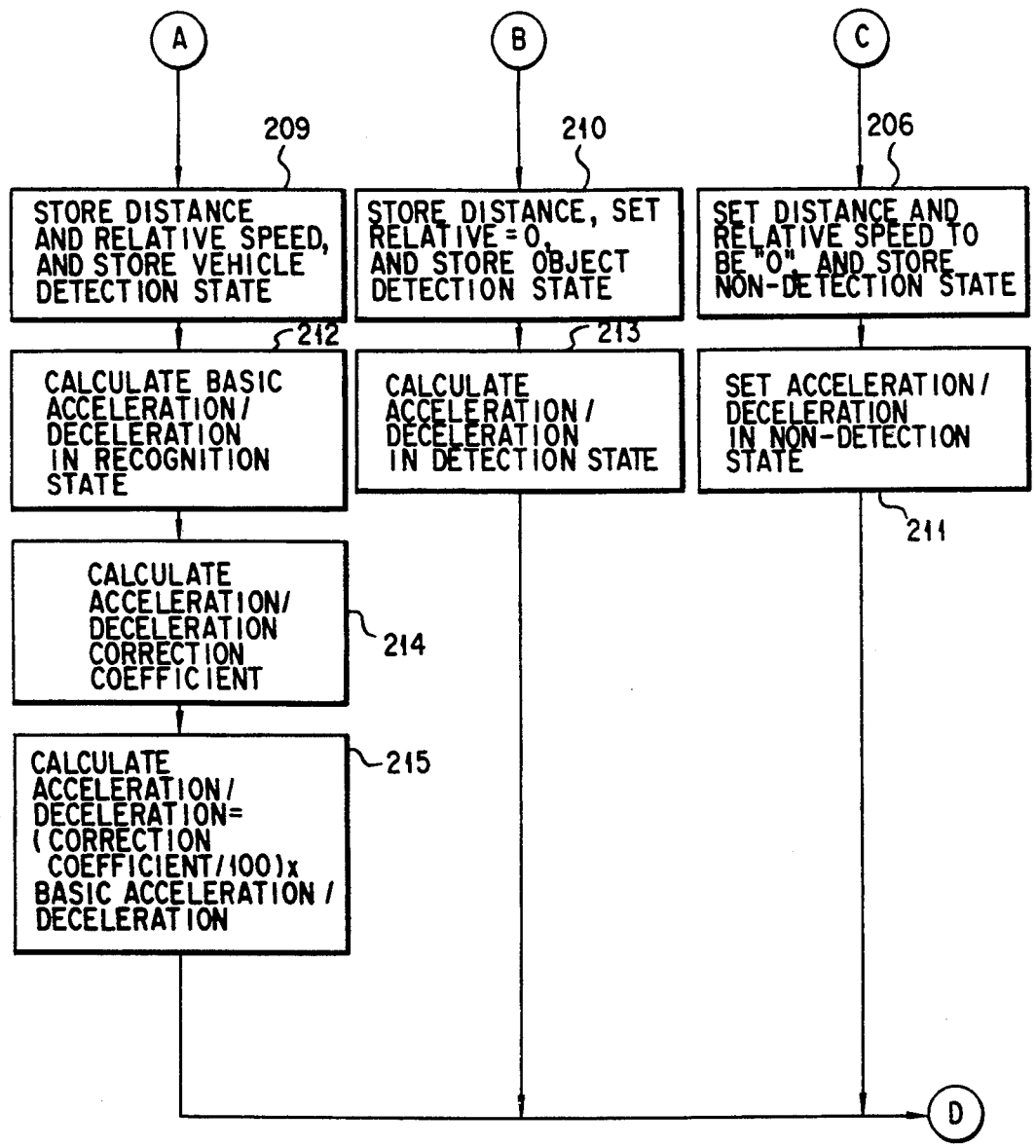

If it is determined in step 203 that the variation of inter-vehicle distance data is large, it is determined that no object is present ahead of the vehicle in practice (non-detection state), and the flow advances to step 206 in FIG. 3B. In step 206, the inter-vehicle distance and the relative speed are set to be "0", and information indicating an object non-detection state is stored.

when the relative speed with the object ahead is stored in the buffer in step 205, relative speeds in units of control periods are compared with each other in step 207 to calculate a variation state of the relative speed. In step 208, the variation state of the relative speed is compared with a setting value. If the variation is smaller than the setting value, it is determined that the object ahead is a vehicle (vehicle recognition state). In step 209 in FIG. 3B, the inter-vehicle distance and the relative speed are stored, and information indicating the vehicle recognition state is stored.

If it is determined in step 208 that the variation state of the relative speed is larger than the setting value, it is determined that the object ahead is other than a vehicle. In step 210 in FIG. 3B, the distance to the object is stored, and the relative speed is set to be "0", thus storing information indicating the object detection state. The above-mentioned processing may be performed inside the inter-vehicle distance sensor 14.

Upon completion of the above-mentioned processing, the processing in the acceleration/deceleration rate calculation section 22 is performed. In each of steps 211 to 213, the acceleration/deceleration of the vehicle are calculated in correspondence with three states, i.e., the object non-detection state, the vehicle recognition state, and the object detection state in steps 206, 209, and 210.

More specifically, when the object non-detection state is confirmed in step 206, the acceleration/deceleration in the non-detection state is set in step 211, and a positive small acceleration rate is set, so that the vehicle is controlled to be gradually accelerated to a vehicle speed initially set by a driver. Note that the vehicle speed may be held or decreased when the vehicle travels along a curved road.

When the vehicle recognition state is stored in step 209, the basic acceleration/deceleration in the vehicle recognition state is calculated in step 212. More specifically, the basic acceleration/deceleration is calculated on the basis of the acceleration/deceleration map shown in FIG. 4A. This map stores two-dimensional map data in which a value obtained by subtracting a target inter-vehicle distance from the current inter-vehicle distance (whether a vehicle ahead is far or near) is plotted along the abscissa, and a relative speed with a vehicle ahead (whether a vehicle ahead approaches or recedes) is plotted along the ordinate. At each matrix point of the abscissa and the ordinate, a corresponding acceleration/deceleration value is presented.

In this map table, a minus (−) sign indicates deceleration, and a plus (+) sign indicates acceleration. Data to be used in practice is obtained by interpolating data of the matrix points.

With this map data, even when the inter-vehicle distance to a vehicle ahead is small, unnecessary deceleration control can be prevented for a vehicle ahead which is receding from the self vehicle. When the self vehicle approaches a vehicle ahead at a large relative speed although the inter-vehicle distance to the vehicle ahead is sufficiently large, deceleration control is started a little early. Thus, fine inter-vehicle distance control corresponding to an actual traveling condition can be performed. Since an acceleration rate is continuously calculated using a single map, acceleration/deceleration control free from feeling of discontinuity can be realized. For example, even if another vehicle breaks in at a position about 16 m ahead of the self vehicle from the target inter-vehicle distance, if the relative speed is +8, the acceleration becomes +2 km/h, and unnecessary deceleration can be avoided.

When the acceleration/deceleration is calculated in step 212 in this manner, a correction coefficient of the acceleration/deceleration is calculated in step 214. The correction coefficient is calculated based on a map shown in FIG. 4B, and a correction value is obtained in correspondence with the current inter-vehicle distance. More specifically, in a large inter-vehicle distance state, since coarse inter-vehicle distance control need only be performed, a relatively small acceleration/deceleration is set to perform easy control, thus improving riding comfort. In step 215, the basic acceleration/deceleration is multiplied with the correction coefficient to calculate an acceleration/deceleration.

Figure 5:
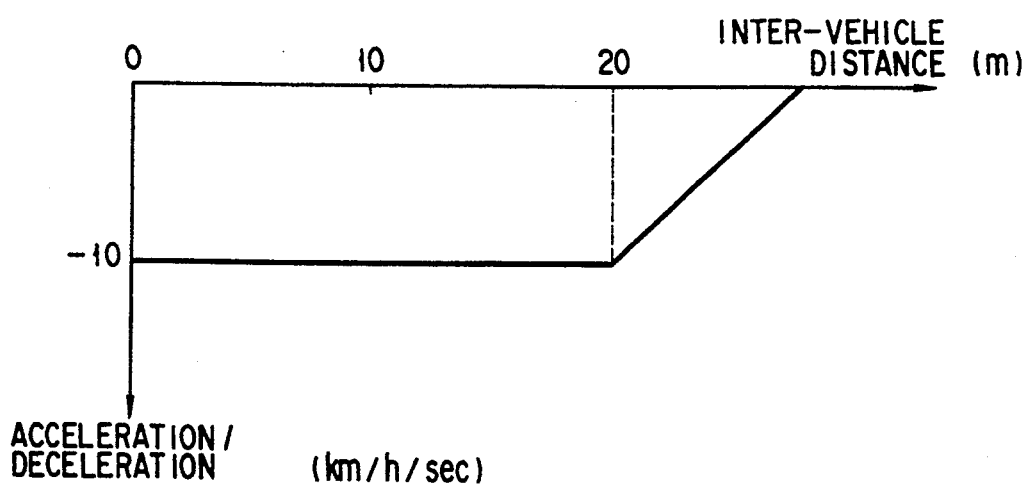
FIG. 5 is a graph showing an acceleration/deceleration map in an object detection state.

When the object detection state is stored in step 210, an acceleration/deceleration in the object detection state is calculated in step 213 using a map shown in FIG. 5. In this map, the current inter-vehicle distance is plotted along the abscissa, and an acceleration/deceleration is calculated in accordance with this inter-vehicle distance. Since the processing in the relative speed calculation section 24 and the vehicle discrimination section 25 requires a relatively long period of time, even before the object ahead is recognized as a vehicle, an emergency countermeasure is taken a little early under an assumption that another vehicle breaks in at a position a small distance ahead of the self vehicle.

Figure 3C:
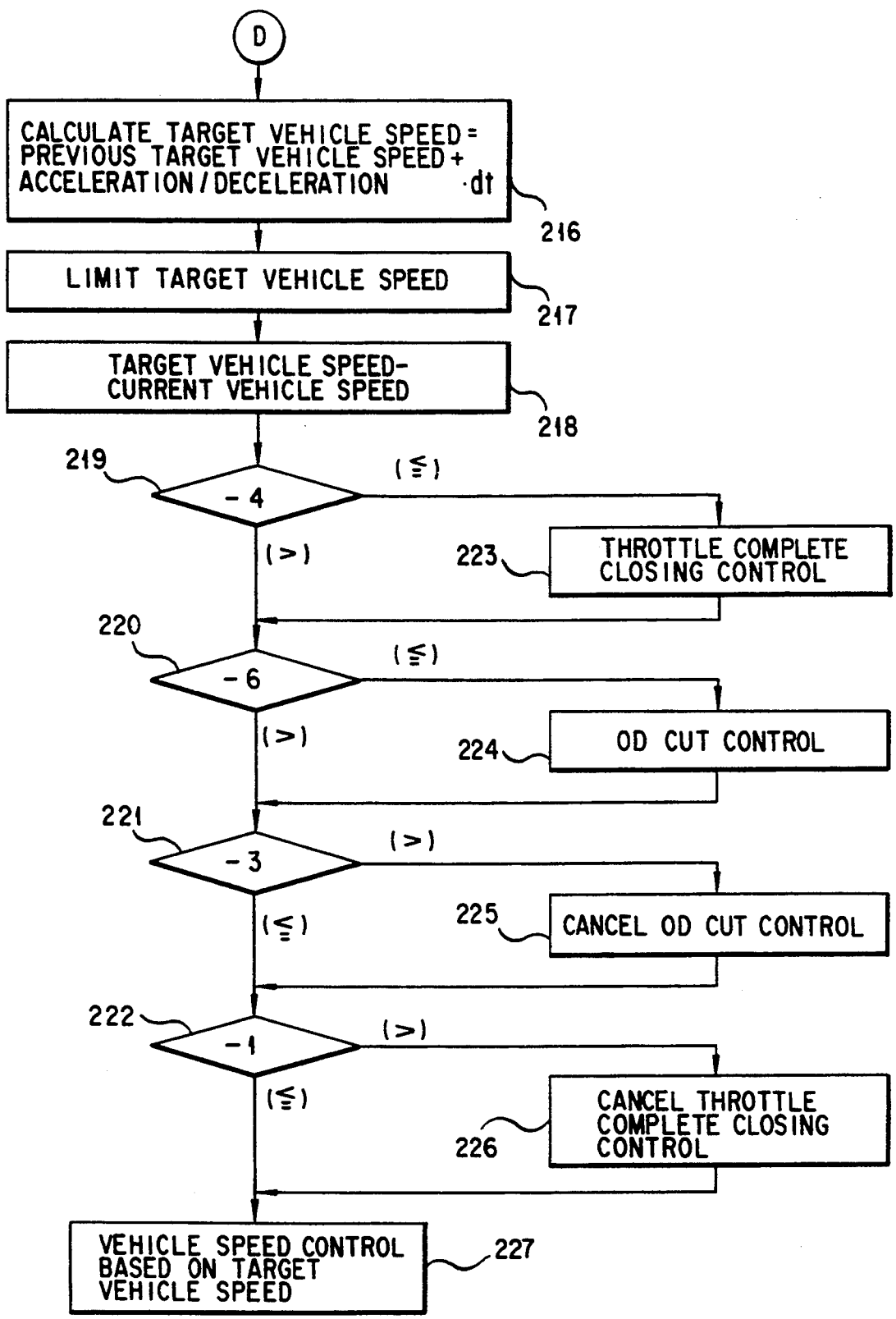

When the acceleration/deceleration corresponding to each of the vehicle recognition state, the object detection state, and the object non-detection state is calculated, a target vehicle speed is calculated in step 216 shown in FIG. 3C. The target vehicle speed is calculated by integrating the calculated acceleration/deceleration with respect to the target vehicle speed in the previous control period. Note that it is the control period.

Since the target vehicle speed is calculated in this manner, an abrupt or discontinuous target vehicle speed can be prevented from being set, and acceleration/deceleration control with smooth feeling as in a steady traveling state can be performed.

In step 217, limit control is made, so that the calculated target vehicle speed is not largely different from the current vehicle speed. This is to prevent abrupt acceleration or deceleration control in the vehicle speed control section 28. In this embodiment, the target vehicle speed is set to be equal to or lower than the vehicle speed set by a driver in view of safety.

Figure 6:
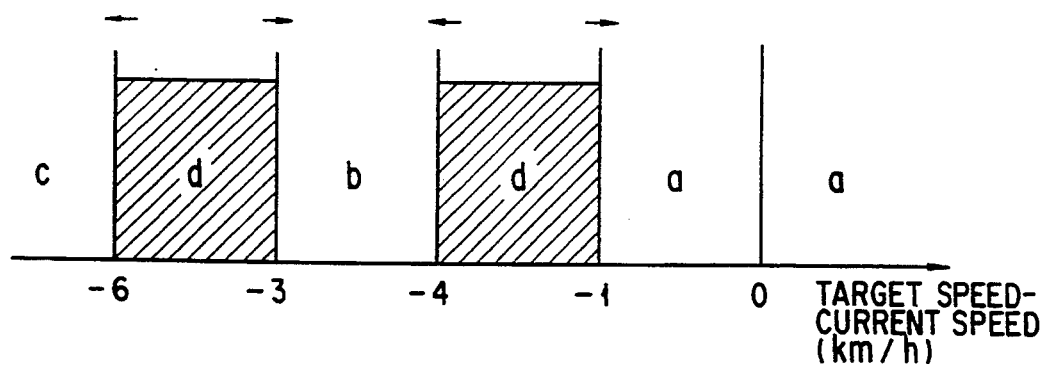
FIG. 6 is a graph showing a region map for selecting a control method.

In the control method examination section 27, a control method is selected using a region map shown in FIG. 6. In this region map, a difference between the target vehicle speed and the current vehicle speed calculated in step 218 is plotted along the abscissa.

In this example, when the target vehicle speed is smaller than the current vehicle speed by 4 km/h or more, the throttle valve is completely closed; when the target vehicle speed is smaller than the current vehicle speed by 6 km/h, an overdrive (OD) range of the transmission is cut (to select a high deceleration rate) additionally. These control states are restored when the speed difference becomes 1 km/h or less and 3 km/h or less. The reason why such a hysteresis is set is to eliminate discontinuity when the control method is changed.

In order to realize control utilizing such a region map, a difference between the target vehicle speed and the current vehicle speed calculated in step 218 is compared with −4, −6, −3, and −1 in steps 219 to 222, respectively. If it is determined in step 219 that the differential speed is larger than −4 km/h, the flow advances to step 223 to perform throttle complete closing processing. If it is determined in step 220 that the differential speed is larger than −6 km/h, the flow advances to step 224 to perform OD cut processing.

If it is determined in step 221 that the differential speed is smaller than −3 km/h, the OD cut control is canceled in step 225, and if it is determined in step 222 that the differential speed is smaller than −1 km/h, the throttle complete closing control is canceled in step 226.

With this processing of the control method examination section 27, a situation that the current vehicle speed is not decreased although the target vehicle speed is decreased, e.g., a down slope traveling state or a low vehicle speed state, is automatically detected, and the transmission is controlled in accordance with the detected situation to select a higher deceleration rate and a high deceleration. Upon combination of such control and conventionally known constant speed control in step 227, vehicle speed control based on the target vehicle speed calculated in step 216 is realized.

According to the constant speed traveling apparatus having the inter-vehicle distance adjustment function with the above-mentioned arrangement, the acceleration/deceleration of the self vehicle is calculated based on the relationship between a difference between the current inter-vehicle distance and a preset target inter-vehicle distance, and the relative speed, the current target speed is calculated based on the acceleration rate and the previously calculated target vehicle speed, and control for causing the actual vehicle traveling speed to approach the target vehicle speed is made. Therefore, even inter-vehicle distance control for keeping a constant; inter-vehicle distance can use a vehicle speed control logic as in a conventional constant speed traveling apparatus, and traveling feeling of constant speed traveling control can be caused to coincide with that of inter-vehicle distance control for keeping a constant inter-vehicle distance. Since the acceleration/deceleration of the self vehicle is calculated based on the relationship between a difference between the current inter-vehicle distance and a preset target inter-vehicle distance, and the relative speed, control corresponding to an actual traveling situation can be realized as compared to a conventional apparatus, which determines a vehicle speed based on only the inter-vehicle distance to a vehicle ahead. For this reason, even when another vehicle unexpectedly breaks in between the self vehicle and a vehicle ahead, abrupt deceleration can be avoided. Furthermore, since the acceleration/deceleration of the self vehicle is corrected in correspondence with the inter-vehicle distance, so that the acceleration/deceleration is decreased as the inter-vehicle distance is larger, easy control is made in a large inter-vehicle distance state, thus improving riding comfort.

Figure 7:
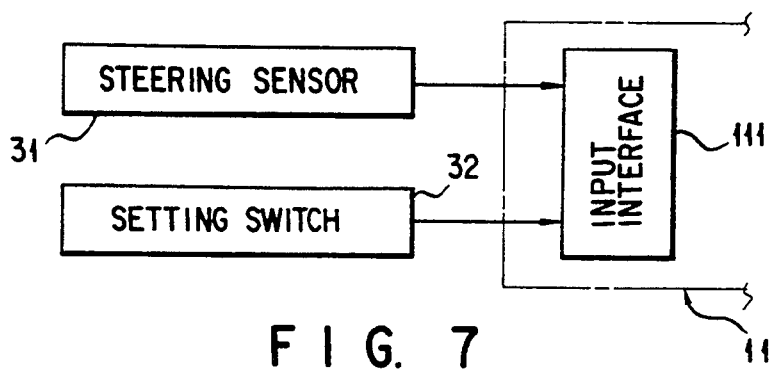
FIG. 7 is a schematic block diagram for explaining the second embodiment of the present invention.

The second embodiment of the present invention will be described below with reference to FIG. 7. In this embodiment, an acceleration corresponding to a control content is changed and set, and smooth following driving control or constant speed traveling control with respect to a vehicle traveling ahead is realized. In this embodiment, a steering sensor 31 for detecting a steering angle is provided to a steering wheel for steering the vehicle, and a setting switch 32 set with, e.g., an acceleration is arranged. The output data from the steering sensor 31 and the setting switch 32 are input to the input interface 111 of the computer 11.

Figure 8:
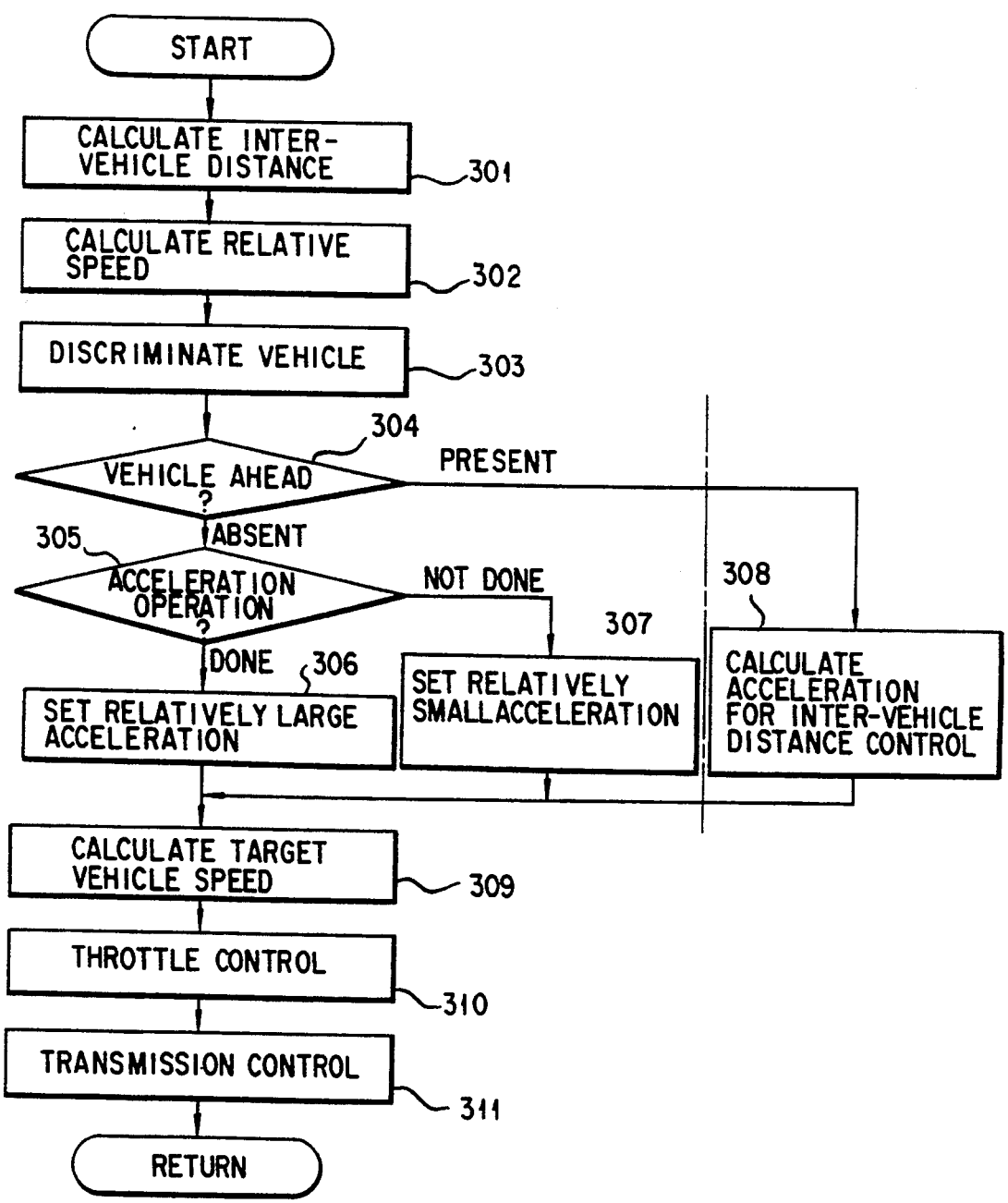
FIG. 8 is a flow chart showing the processing flow of constant speed traveling control in the second embodiment.

FIG. 8 is a flow chart showing the flow of processing for executing constant speed traveling control in a constant speed traveling control apparatus according to this embodiment. In step 301, an inter-vehicle distance is calculated, and in step 302, a relative speed with a vehicle ahead is calculated. In step 303, vehicle discrimination for discriminating whether or not a vehicle is present ahead of the self vehicle is performed based on a variation of the inter-vehicle distance or the relative speed. In step 304, whether or not a vehicle is present ahead of the self vehicle is determined on the basis of the discrimination result in step 303. In step 305, it is checked if a driver performs an acceleration operation using the setting switch 32. If it is determined in step 304 that no vehicle is present ahead of the self vehicle, and if it is determined in step 305 that the acceleration operation is performed, a relatively large acceleration is set in step 306. For example, an acceleration of "2.0 km/h/sec" which allows a driver to sufficiently experience acceleration feeling is set.

Even if it is determined in step 304 that no vehicle is present ahead of the self vehicle, if the driver does not perform an acceleration operation, a relatively small acceleration (e.g., "0.6 km/h/sec") is set in step 307 to cope with a case wherein a vehicle is, in fact, present ahead of the self vehicle, thus assuring safety.

The acceleration can be set in step 306 or 307 in correspondence with various traveling situations. For example, the acceleration may be varied depending on the vehicle speed or the steering angle of the steering wheel. For example, in step 307, the acceleration is varied in accordance with steering angle data obtained from the steering sensor 31, and the acceleration is increased at a rate of 0.5 km/h/sec to have an acceleration/deceleration DVSTR obtained based on map data shown in, e.g., FIG. 9 as a limit value.

The reason why the acceleration/deceleration DVSTR is not directly set as an acceleration is to prevent an acceleration from being generated or a deceleration from being decreased when a vehicle ahead becomes instantaneously out of sight during deceleration in inter-vehicle distance control.

Since the acceleration is set based on the steering angle using the detection signal from the steering sensor 31, when a vehicle travels along a curved road, a relative small acceleration is set or the vehicle is decelerated, thus improving safety.

If it is confirmed in step 304 that a vehicle is present ahead of the self vehicle, an acceleration and its correction coefficient for inter-vehicle distance control are calculated according to various factors such as an inter-vehicle distance., a relative speed, and the like, in step 308. More specifically, the acceleration and correction coefficient are calculated using the maps shown in FIGS. 4A and 4B as in the first embodiment.

In step 309, a target vehicle speed is calculated in the same manner as in the processing in step 216 shown in FIG. 3C. After the target vehicle speed is calculated in this manner, a deviation between the target vehicle speed and the current vehicle speed is calculated, the throttle is controlled based on the deviation value in step 310, and the transmission is controlled in step 311, thereby varying the vehicle speed toward the target vehicle speed.

In this inter-vehicle distance control, in a safety assured state wherein absolutely no vehicle is present ahead of the self vehicle, acceleration control up to a preset vehicle speed is made quickly, thus realizing safe and comfortable drive control.

Figure 10:
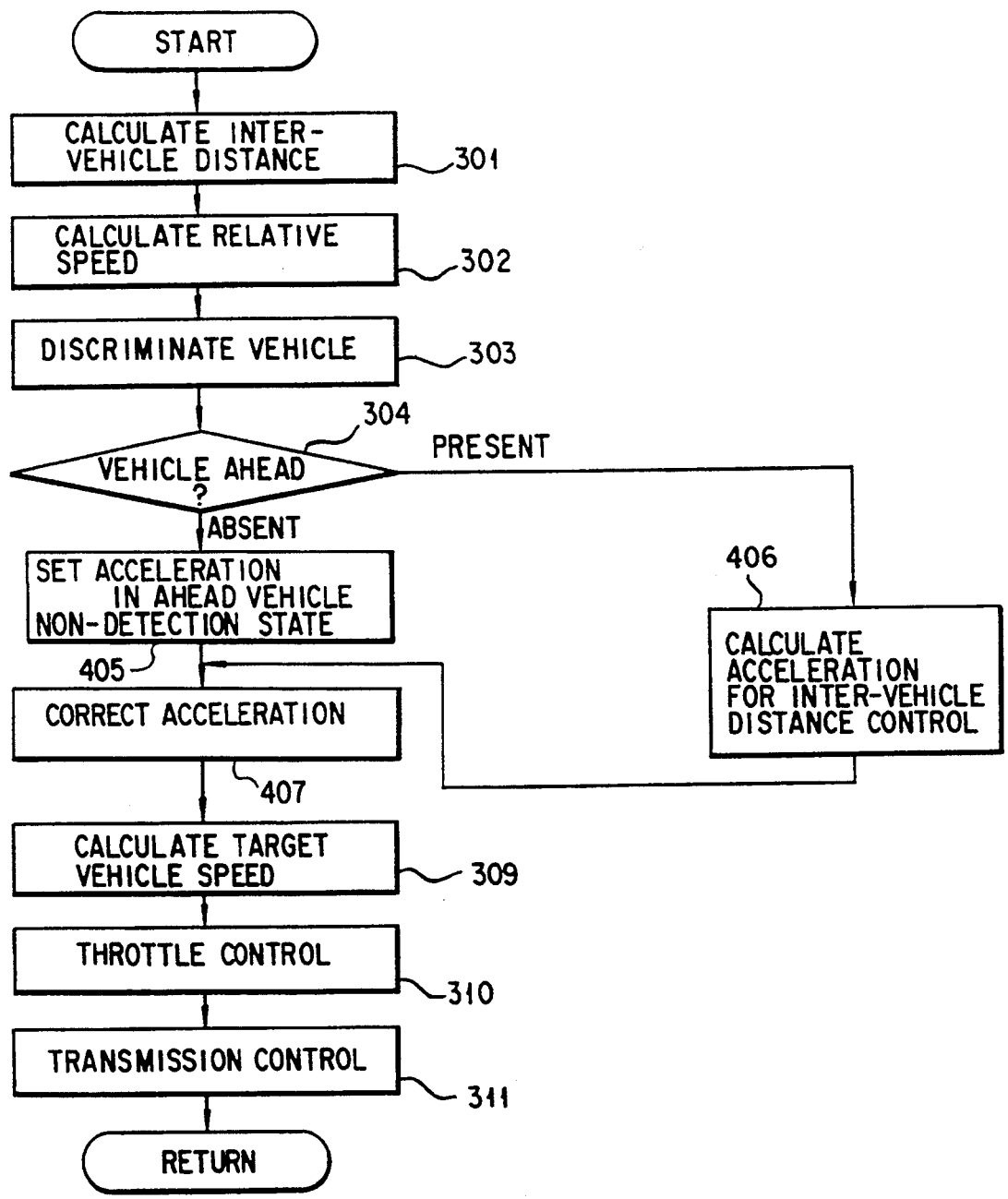
FIG. 10 is a flow chart for explaining the third embodiment of the present invention.

In this case, a target acceleration may be set in the setting switch 32, and a target acceleration may be corrected based on the setting value. FIG. 10 is a flow chart showing the processing flow for explaining the third embodiment. The processing in steps 301 to 304 is the same as that in FIG. 8. If it is determined in step 304 that no vehicle is present ahead of the self vehicle, an acceleration in an ahead vehicle non-detection state is set in step 405. More specifically, the same processing as in step 307 in the processing shown in FIG. 8 is executed. On the other hand, if it is determined in step 304 that a vehicle is present ahead of the self vehicle, an acceleration for inter-vehicle distance control is calculated in step 406 to follow the vehicle ahead. That is, the same processing as in step 308 in FIG. 8 is executed.

When the acceleration is calculated in step 405 or 406, the calculated acceleration is corrected in step 407. In this acceleration correction step, the acceleration is corrected using the following equation. In the equation for obtaining a corrected acceleration, a correction coefficient k is set by a driver using a volume of a setting section (setting switch 32), as shown in, e.g., FIG. 11.

$$\Delta Vt' = k \cdot \Delta Vt$$

where
$\Delta Vt'$: acceleration after correction
$\Delta Vt$: acceleration before correction The correction coefficient can be set according to a driver's favor in this manner. Also, a correction coefficient corresponding to a traveling lane may be set. Therefore, since the acceleration corresponding to a traveling lane or driver's favor can be set, more safe and comfortable inter-vehicle distance control can be realized. Thereafter, the same processing as in step 309 and the subsequent steps in FIG. 8 is executed to make traveling speed control.

As for correction in a deceleration state, to assure safety, the deceleration is not corrected in correspondence with an inter-vehicle distance or a relative speed, or only mild correction is performed if it is ever done. This is because, even when a driver desires slow control, immediate braking of the self vehicle is required when a vehicle traveling ahead decelerates suddenly.

Figure 12:
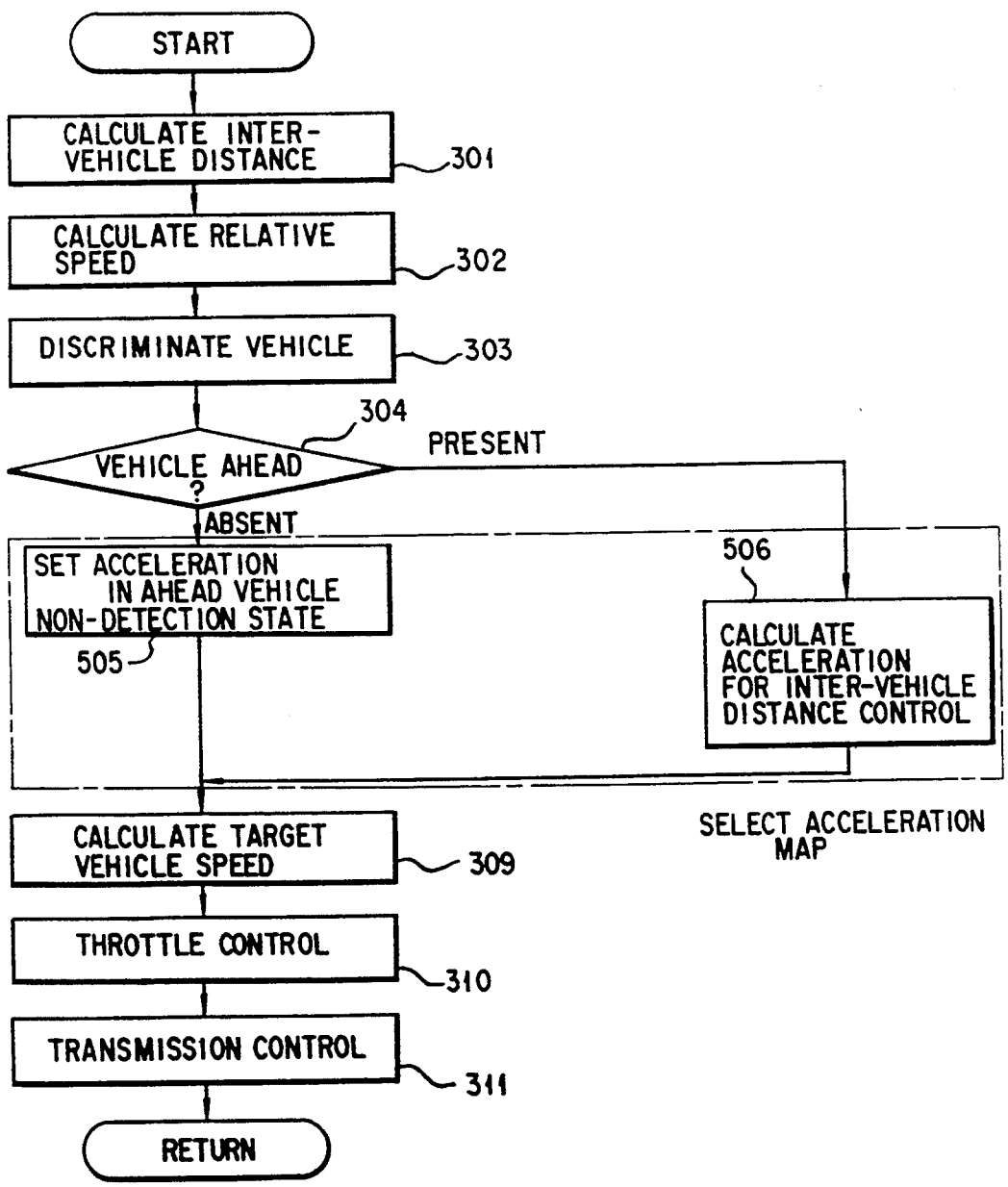
FIG. 12 is a flow chart for explaining the fourth embodiment of the present invention.

In place of correcting the acceleration, an acceleration parameter or map may be switched by a setting section. FIG. 12 is a flow chart showing the processing flow of the fourth embodiment. After the processing in steps 301 to 304, an acceleration is calculated in step 505 or 506. When the acceleration is calculated in step 505 or 506, a basic acceleration parameter or map is selected from data pre-stored in the ROM 114 of the computer 11 upon operation of the setting switch 32 by a driver.

Figures 4A, 4B:
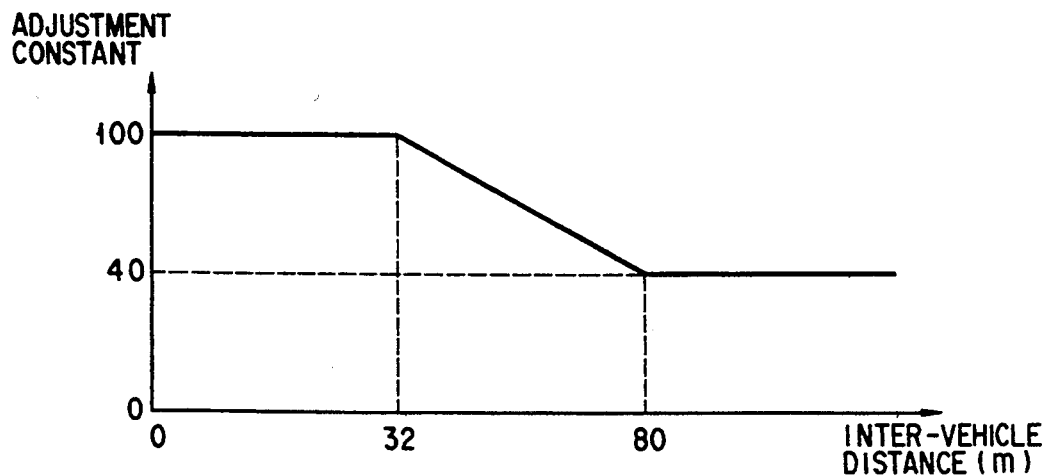
FIGS. 4A and 4B are respectively a table and a graph showing an acceleration/deceleration basic map and an acceleration/deceleration correction map.

More specifically, the map shown in FIG. 4A as a basic map for inter-vehicle distance control, and a basic map shown in FIG. 13 are stored in the ROM 114. A relatively small acceleration is set in the map shown in FIG. 4A, and a relatively large acceleration is set in the map shown in FIG. 13. When one of these maps is selected, a slow or quick drive mode is selected.

As the characteristic feature of the apparatus which can switch the acceleration map, since the acceleration map itself is switched, the correction rate can be changed in accordance with element values such as the inter-vehicle distance, relative speed, and the like of the map, i.e., various situations, while the acceleration is uniquely corrected in correction using a correction coefficient.

In a system, which has no acceleration calculation means, and immediately determines a target vehicle speed or a throttle opening degree, correction or switching of the maps may be performed in accordance with the target vehicle speed or the throttle opening degree.

According to the constant speed traveling control apparatus in each of the second to fourth embodiments, acceleration control up to a preset vehicle speed is realized in correspondence with an inter-vehicle distance to a vehicle ahead. For example, in a safety assured situation wherein it is determined that no vehicle is present ahead of the self vehicle, the self vehicle is quickly accelerated to the preset vehicle speed, and in particular, the acceleration is set in correspondence with, e.g., a driver's favor. Therefore, constant speed traveling control allowing comfortable inter-vehicle distance control can be executed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A constant speed traveling apparatus for a vehicle having an inter-vehicle distance adjustment function, comprising:

inter-vehicle distance measurement means for measuring a distance from a self vehicle to an object present ahead;

relative speed calculation means for calculating a relative speed between the object and the self vehicle by calculating a change in distance data measured by the inter-vehicle distance measurement means;

vehicle recognition means for recognizing based on a change in the relative speed calculated by the relative speed calculation means that the object ahead is a vehicle;

acceleration/deceleration calculation means for, when the vehicle recognition means recognizes that the object ahead is a vehicle, calculating an acceleration/deceleration of the self vehicle on the basis of a difference between the distance data to the object ahead and a target inter-vehicle distance;

target speed calculation means for calculating a target vehicle speed on the basis of the calculated acceleration/deceleration and a previously calculated target vehicle speed; and vehicle speed control means for performing acceleration/deceleration control which causes a traveling speed of the self vehicle to approach the target vehicle speed of the current processing on the basis of a difference between the calculated target vehicle speed and the current vehicle speed.

2. An apparatus according to claim 1, wherein the acceleration/deceleration calculation means includes acceleration/deceleration storage means for storing acceleration or deceleration data in association with a difference between the inter-vehicle distance corresponding to the distance to the object ahead measured by said inter-vehicle distance measurement means and the target inter-vehicle distance, and the relative speed between the vehicle ahead and the self vehicle.

3. An apparatus according to claim 2, wherein the acceleration/deceleration calculation means include two-dimensional map data in which a value obtained by subtracting the target inter-vehicle distance from the current inter-vehicle distance is set along one axis, and the relative speed between the vehicle ahead and the self vehicle is set along the other axis, and corresponding acceleration/deceleration are set at matrix points of the two axes.

4. An apparatus according to claim 1, wherein the acceleration/deceleration calculation means comprises correction means for correcting the acceleration/deceleration of the vehicle to decrease the acceleration/deceleration as the inter-vehicle distance is larger, on the basis of the inter-vehicle distance corresponding to the distance to the object ahead measured by the inter-vehicle distance measurement means.

5. An apparatus according to claim 4, wherein the correction means comprises correction coefficient storage means set with correction coefficients in accordance with the inter-vehicle distance.

6. An apparatus according to claim 5, wherein the correction coefficient storage means comprises a control map for storing the correction coefficients which decrease in accordance with an increase in the inter-vehicle distance, thereby permitting the calculated acceleration/deceleration to decrease in accordance with an increase in the inter-vehicle distance.

7. An apparatus according to claim 1, wherein the vehicle recognition means comprises means for discriminating a variation of the change in the relative speed detected by the relative speed detection means, and when the discriminating means discriminates that the variation is small, the vehicle recognition means recognizes that the object ahead is a vehicle.

8. An apparatus according to claim 1, wherein the acceleration/deceleration calculation means includes second acceleration/deceleration calculation means selected when the vehicle recognition means discriminates that the object ahead is not a vehicle, and the second acceleration/deceleration calculation means comprises means for storing data set with acceleration/deceleration corresponding to distance data to the object.

9. An apparatus according to claim 8, wherein the acceleration/deceleration data stored in the second acceleration/deceleration calculation means are arranged to set a large deceleration in a state wherein the distance to the object ahead is equal to or smaller than a setting value, and to decrease the deceleration in a state wherein the distance to the object ahead becomes larger than the setting value.

10. An apparatus according to claim 1, wherein the vehicle speed control means comprises a plurality of vehicle speed adjustment mechanisms for causing the traveling speed of the vehicle to approach the target vehicle speed, the vehicle speed adjustment mechanism being selected based on a plurality of deceleration data which correspond to differences between the target vehicle speed and the travelling vehicle speed upon execution of the acceleration/deceleration control.

11. An apparatus according to claim 10, wherein the plurality of vehicle speed adjustment mechanisms include a throttle mechanism for controlling a rotational speed of an engine, and a transmission mechanism for transmitting a rotational driving force of the engine to wheels, and comprises a region map for selecting an opening degree of the throttle mechanism and a shift range of the transmission mechanism in correspondence with the difference between the target vehicle speed and the current vehicle speed.

12. An apparatus according to claim 1, wherein the vehicle recognition means includes means for discrimination a variation of the distance data to the object ahead, and determining a non-detection state of the object ahead in a state wherein the variation of the distance data is large, and the acceleration/deceleration calculation means includes non-detection state acceleration/deceleration calculation means selected upon determination of the non-detection state of the object.

13. An apparatus according to claim 12, wherein the non-detection state acceleration/deceleration calculation means sets a positive acceleration for increasing the travelling vehicle speed to approach the target vehicle speed.

14. An apparatus according to claim 1, further comprising:
    steering angle detection means provided in a steering mechanism for detecting steering angle data; and
    acceleration/deceleration changing means for changing the acceleration/deceleration calculated by the acceleration/deceleration calculation means on the basis of the steering angle data detected by the steering angle detection means.

15. An apparatus according to claim 14, wherein the acceleration/deceleration changing means comprises map data set with acceleration/deceleration data in correspondence with the steering angle data detected by the steering angle detection means, and the map data are arranged to increase a deceleration in a state wherein the steering angle data is large.

16. A constant speed traveling apparatus for a vehicle having an inter-vehicle distance adjustment function, comprising:
    means for determining a travelling speed of a self vehicle;
    means for generating a preset constant travelling speed of the self-vehicle;
    front-vehicle detection means for detecting a presence/absence of a front vehicle traveling ahead of the self vehicle;
    inter-vehicle distance determination means for determining a target inter-vehicle distance to be set between the self vehicle and the front vehicle;
    inter-vehicle distance measurement means for measuring an inter-vehicle distance between the self vehicle and the front vehicle is a state where the front-vehicle detection means detects the presence of the front vehicle;
    relative speed calculation means for calculating a relative speed of the self vehicle relative to the front vehicle on the basis of variations in the inter-vehicle distance measured by the inter-vehicle distance measurement means;
    first acceleration calculation means for calculating an acceleration/deceleration required for the inter-vehicle distance to become equal to the target inter-vehicle distance, the acceleration/deceleration being calculated based on the measured inter-vehicle distance and the calculated relative speed when the front-vehicle detection means detects the presence of the front vehicle;

second acceleration calculation means for calculating an acceleration/deceleration required for the traveling speed of the self vehicle to become equal to the preset constant traveling speed, in the state where the front-vehicle detection means detects the absence of the front vehicle;

target vehicle speed calculation means for calculating a new target vehicle speed on the basis of the acceleration/deceleration calculated by one of the first and second acceleration calculation means and a target vehicle speed previously calculated by the target vehicle speed calculation means;

vehicle speed control means for controlling the traveling speed of the self vehicle on the basis of a difference between the previously calculated target vehicle speed and the traveling speed of the self vehicle, such that the traveling speed of the self vehicle is made to approach the new target vehicle speed calculated by the target vehicle speed calculation means; and acceleration changing means for changing the acceleration/deceleration calculated by the first and second acceleration calculation means, on the basis of an operation performed by a driver.

17. An apparatus according to claim 16, further comprising a changeover switch operated by the driver for selecting an acceleration/deceleration-calculating arithmetic method used by the first and second acceleration calculation means.

18. An apparatus according to claim 17, wherein the first acceleration calculation means includes a control map in which data regarding the inter-vehicle distance measured by the inter-vehicle distance measurement means and acceleration data corresponding to the relative speed calculated by the relative speed calculation means are set, the control map including at least two maps in which different acceleration data are set, one of the maps being selected by the changeover switch.

19. An apparatus according to claim 18, further comprising acceleration operation detection means for detecting whether or not an acceleration operation is performed by the driver, wherein one of the two maps included in the control map is selected based on whether or not the acceleration operation is performed by the driver, and wherein the one map used for setting relatively large accelerations is selected when the acceleration operation detection means detects that the acceleration operation is performed by the driver.

* * * * *